US007548874B2

(12) United States Patent
Kanevsky et al.

(10) Patent No.: US 7,548,874 B2
(45) Date of Patent: Jun. 16, 2009

(54) SYSTEM AND METHOD FOR GROUP ADVERTISEMENT OPTIMIZATION

(75) Inventors: Dimitri Kanevsky, Ossining, NY (US); Wlodek W. Zadrozny, Tarrytown, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1494 days.

(21) Appl. No.: 09/422,195

(22) Filed: Oct. 21, 1999

(65) Prior Publication Data

US 2003/0088463 A1 May 8, 2003

(51) Int. Cl.
*G06Q 30/00* (2006.01)

(52) U.S. Cl. ........................................ 705/14
(58) Field of Classification Search ................ 705/14
See application file for complete search history.

(56) References Cited

U.S. PATENT DOCUMENTS

| | | | | | |
|---|---|---|---|---|---|
| 4,931,865 | A | * | 6/1990 | Scarampi | 725/12 |
| 5,201,010 | A | * | 4/1993 | Deaton et al. | 382/139 |
| 5,305,390 | A | * | 4/1994 | Frey et al. | 382/115 |
| 5,754,939 | A | * | 5/1998 | Herz et al. | 455/3.04 |
| 5,781,650 | A | * | 7/1998 | Lobo et al. | 382/118 |
| 5,970,469 | A | * | 10/1999 | Scroggie et al. | 705/14 |
| 6,149,056 | A | * | 11/2000 | Stinson et al. | 235/379 |
| 6,177,931 | B1 | * | 1/2001 | Alexander et al. | 345/721 |
| 6,256,043 | B1 | * | 7/2001 | Aho et al. | 345/629 |
| 6,327,573 | B1 | * | 12/2001 | Walker et al. | 705/14 |
| 6,334,109 | B1 | * | 12/2001 | Kanevsky et al. | 705/14 |
| 6,408,278 | B1 | * | 6/2002 | Carney et al. | 705/14 |
| 2001/0028662 | A1 | * | 10/2001 | Hunt et al. | 370/487 |
| 2002/0046100 | A1 | * | 4/2002 | Kinjo | 705/14 |
| 2003/0088463 | A1 | * | 5/2003 | Kanevsky et al. | 705/14 |

OTHER PUBLICATIONS

"Nielsen Air survey identifies potential for airport ads", World Airport Week, vol. 2 No. 26, Jul. 27, 1995.*
"Catalina Marketing Corporation", Food & Beverage Marketing, vol. 18, No. 3, pp. 16(2), Mar. 1999.*
"Experian buys direct mail company for $246.2 million", Los Angeles Times, Orange County Edition, co1D, p. 1, Apr. 15, 1997.*
"LikeMinds merges with Andromedia", Business Wire, Oct. 7, 1998.*

* cited by examiner

*Primary Examiner*—Donald L Champagne
(74) *Attorney, Agent, or Firm*—Scully, Scott, Murphy & Presser, P.C.; Daniel P. Morris, Esq.

(57) ABSTRACT

A system and method is disclosed for producing an advertisement that is optimized to a particular user or group of users for a current transaction and is presented to such users at the point of sale or transaction terminal at a public location. The transaction terminal produces current transaction data that includes customer identity, and goods/services being purchased and their prices. The current transaction data is sent to an advertisement server via a network such as the Internet. The advertisement server implements a user database device, a goods database and an advertisement database to locate an existing advertisement or create a new advertisement that is optimized according to common characteristics of the particular group. The optimized advertisement is sent to the transaction terminal for presentation to the user on a monitor or like display device or, printed on a sales receipt.

29 Claims, 4 Drawing Sheets

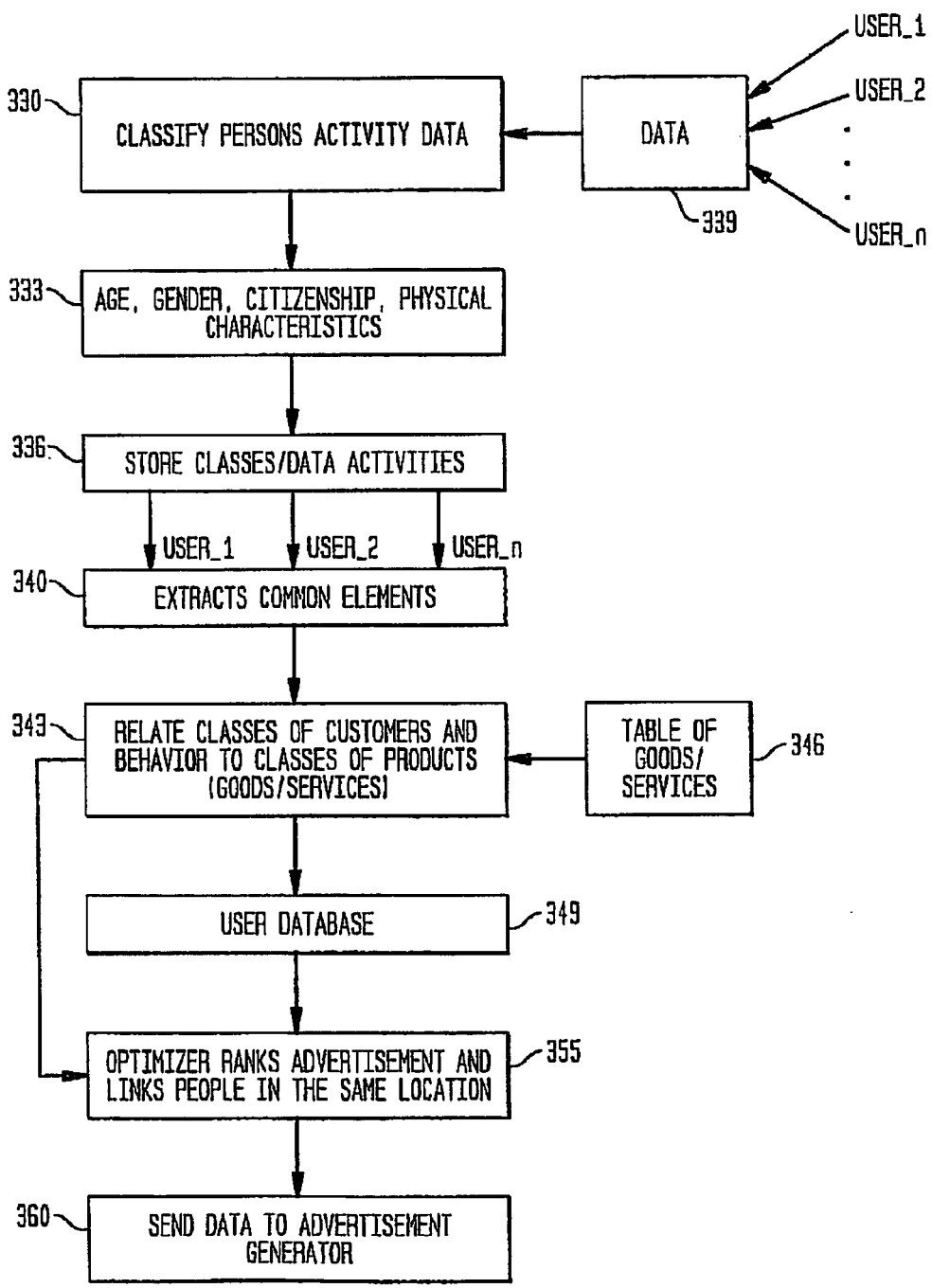

SYSTEM AND METHOD FOR GROUP ADVERTISEMENT OPTIMIZATION

BACKGROUND OF THE INVENTION

1. Field of the Invention

The present invention relates generally to systems and methods for providing product and service advertisements through networks for communication via video displays or loud speakers at public locations. More particularly, the system of the invention provides advertisements that are optimized in accordance with characterizations of people that happen to be at the public location at a given time.

2. Discussion of the Prior Art

Advertisements bring people's attention to available goods and/or services. Advertisements are usually provided via radio, television (TV), newspapers, letter hand-outs, junk mail and similar media, and provided to members of the public in public places, e.g., movie theaters, on bill boards etc. The problem with these kinds of advertisements is that they do not distinguish among different users according to the user's tastes, interests, hobbies. That is, some advertisements are specific for some classes of people (for example, children, adults, men, women and other classes).

Class specific advertisements are still too broad to take into account characteristics specific to a particular user. Class specific advertisements are sometimes displayed in places where there are no users who are members of the class.

Commonly-owned, co-pending U.S. patent application Ser. No. 09/183,402, entitled "DISTRIBUTED PERSONALIZED ADVERTISEMENT SYSTEM AND METHOD" (IBM D#YO998-374) now U.S. Pat. No. 6,334,109 B1, the whole content and disclosure of which is incorporated by reference as if fully set forth herein, suggests some ways for providing advertisements that are specialized for individual users. This is done by identifying individuals when they perform transactions and generating the advertisement that is based on this user profile that is stored in special user databases. These individual advertisements are displayed on some means that accompany and/or enables the user transaction, e.g., tickets, back sides of receipts, teller terminals etc.

However, this approach still does not solve the problem of presenting advertisements that best fit a group of persons located in a public location such as, e.g., a movie theater, a shop, a stadium etc.

It would be highly desirable to provide a system and method for presenting advertisements that are optimized to best fit a group of persons at a public location.

SUMMARY OF THE INVENTION

An object of the present invention is to provide a system, method, and memory media for providing an optimized advertisement to a group of persons via a communication network to public displays or loud speakers.

Another object of the present invention is to provide a system and method for detecting and observing all persons in some location, obtaining and using their personal identity and characteristic information in order to provide them with optimized advertisements.

Yet another object of the present invention is to provide a system and method for using public displays to distribute group optimized advertisements.

Still another object of the present invention is to provide a system and method for accessing and using users personal databases and their identities for optimizing an advertisement that is sent to a location where those particular users are gathered.

In accordance with these objects, the optimized group advertisement system generates an advertisement based on personal data of each of the persons in the group. First, the group advertisement system identifies persons of a group of persons at the public location from data obtained by their product purchasing transactions, for example, tracks their personal data, and identifies most common characteristics for members in that group. Particularly, a process is implemented that includes classifying current transaction data as to categories of products/services to produce classification data and, by relation to prior transactions performed by the particular user (s), producing relation data. The classification and relation data are then used to alter each user's personal data. An optimized advertisement is then generated that is most suited for most of identified members in the group. The optimized group advertisement system operates in conjunction with the personalized advertisement system such as described in above-mentioned commonly-owned, co-pending U.S. patent application Ser. No. 09/183,402 (YO998-374), now U.S. Pat. No. 6,334,109 B1, to obtain required data from the personalized system.

Particularly, the characteristic and identity data includes: name, physical characteristics, age, gender, products/services and prices chosen by the particular user in a purchase transaction, and, optionally, the biometric information obtained from people of the group. The classification is performed according to criteria selected from the group that includes: age, gender, area of residence, citizenship and physical characteristics of the particular user, and type and price of products/services involved in the current transaction. The relation data is according to a relation between classes of customers and categories of products/services.

According to a preferred embodiment of the invention, there is provided a system and method for generating an advertisement optimized for one or more persons located at a public location, the system comprising a device for obtaining data relating to one or more persons at a public location during a period of time; processing device that receives the obtained data, collects data relating to personal characteristics of one or more persons based on said received data, and extracting common personal characteristics from the collected data; a device for generating an advertisement related to products or services, the advertisement optimized according to the common personal characteristics for the one or more persons at the location; and, a device for transmitting the optimized advertisement to a communication device located at said public location for communicating the optimized advertisement to the one or more persons.

In accordance with another aspect of the present invention, there is provided a method for generating an advertisement that is optimized for one or more persons located at a public location, including the steps of: storing in a database data concerning a plurality of (a) persons, (b) activities, goods or services and (c) advertisements for various ones or categories of said goods or services; receiving, via one or more I/O devices, data concerning activities of a group of persons; identifying common characteristics in some members of the group; identifying the most suitable sub-group of persons for a common advertisement; generating the advertisement optimized to the largest segment of persons in the location; and, communicating the group optimized advertisement to public displays.

The optimized group advertisement may be communicated to the group of users in public places, e.g., cinema, train stations, streets, etc. via loud-speakers and/or display devices such as movie screens, electronic bill boards, television monitors, or, other digital display devices.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
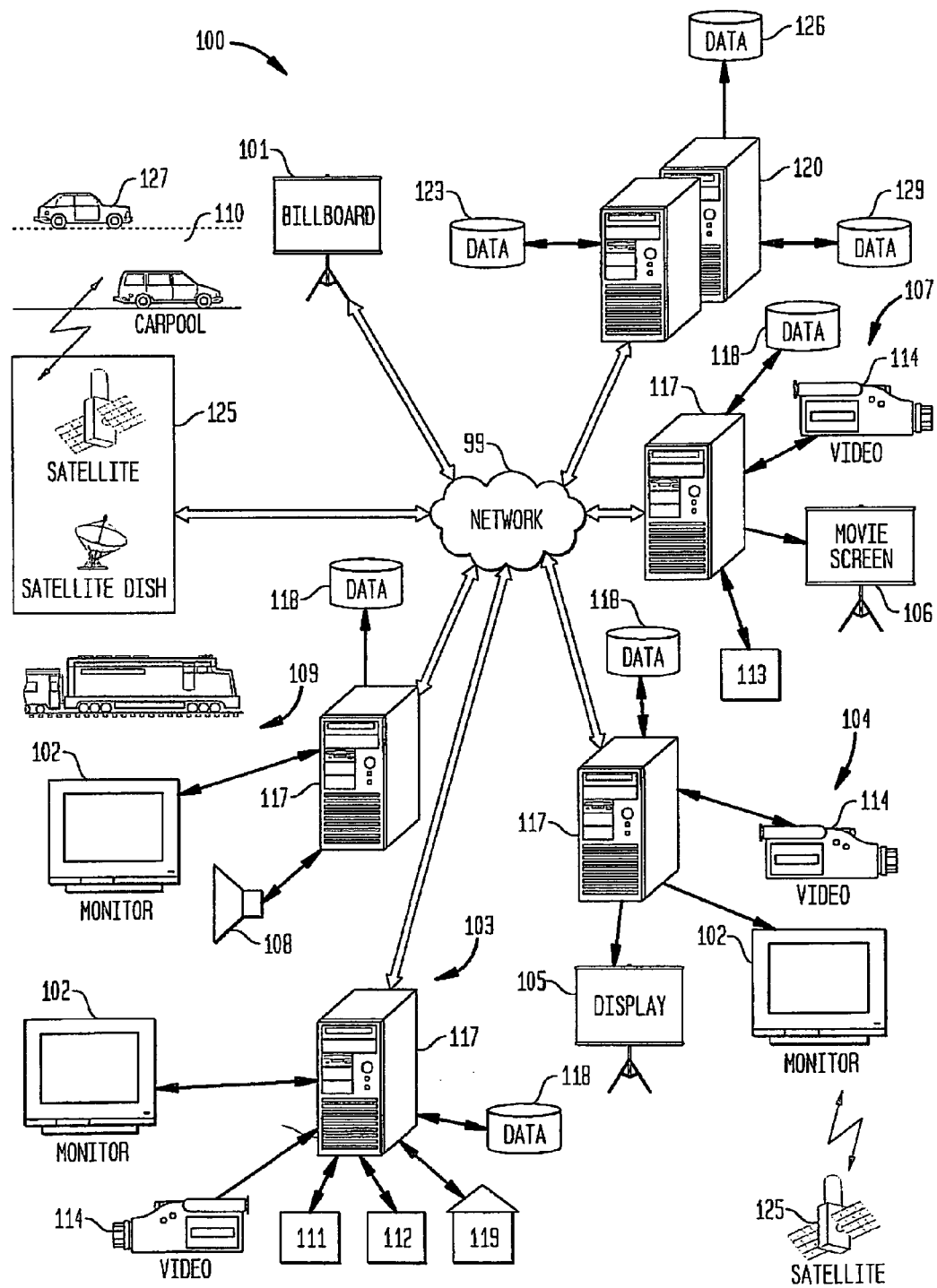
FIG. 1 is a pictorial diagram of a distributed group optimized advertisement system 100 of the present invention.

With reference to FIG. 1, there is illustrated the group advertisement system 100 for providing an advertisement at a public location that has been optimized for a particular user or group of users according to the present invention. Referring to FIG. 1, the system 100 is implemented at public locations that are equipped with various types of media communication devices including, but not limited to: electronic billboard displays 101, television and monitors or digital display devices 102, or loud speaker systems 108, large screen displays 105, projection and movie screens 106, or virtually any display media where advertisements can be sent electronically via a network 99. The public locations include virtually any location where people congregate or perform activities including, but not limited to: food/shopping markets, department stores, shopping centers and malls 103, public transportation terminals, e.g., train station 109, concert halls and stadiums 104 providing concerts and sporting events, movie theaters 107, etc.

Additionally, included in the system 100 are devices used for identifying persons and their activities such as current purchasing of goods, prices, etc. Devices performing this identification function include sales service devices such as a cash register 111, a shopping card or credit card reader 112, e.g., such as may be provided in a shopping or department store 103 checkout, a bar-code card reader, a ticket sales or automatic vendor machines 113, which may be installed in movie theaters 107 to enable payment for movie tickets via credit cards, for example. Other devices implemented for identifying characteristics of persons includes video-camera devices 114 that may be provided in public locations such as the transportation terminal 109, movie theater 107, the shopping center 103, and the stadium 104. Sales ticket machines may also be implemented at the public transportation terminal, stadium, etc. A detailed description on how video camera system, ticket sale machines, bar-code and credit card readers may be implemented to identify persons is described in the above-mentioned patent application YO998-374, herein incorporated by reference.

Additionally, at each public location 103, 104, 107 and 109, there is provided a local server device(s) 117 which may be connected to and support operation of the following clients: cash registers 111, bar-code and/or credit card readers 112, video cameras 114, and public display monitors 102 and audio loud speaker systems 108. For example, the local server 117 at the movie theater 107 may be connected to the ticket sales machine 113 and a movie projection system (not shown) that displays advertisement content on the movie screen 106. The local server 117 at the stadium 104 is shown in FIG. 1 as connected to video-camera system 114 and public display monitor 102. Each server 117 may include a database 118 comprising information about the patrons and customers who often attend/visit or shop at these locations. As will be explained in greater detail herein, the local server device 117 collects and forwards data to a group advertisement server 120 via a network 99 which processes the collected information and generates group optimized advertisements that are downloaded to the servers 117 for public display. It is understood that the network 99 includes the Internet.

Particularly, the group advertisement system 100 may include one or a cluster of group advertisement server(s) 120 for receiving personal characteristic and identity information about customers, e.g., their physical attributes, current and prior activity or purchasing transactions, etc., and assisting in the generation of group optimized advertisements, as described herein. In the generation of group optimized advertisements, each group advertisement server 120 accesses one or more database devices, including: a goods/services database 123 which includes data relating to goods and services that are generally available on the market; a person/customer database 126 which includes, for each of a plurality of persons/customers, information for identifying persons including a history of their prior good/services transactions; and, an advertisement database 129 which includes a plurality of advertisements for goods/services that may be group optimized. Databases 123, 126 and 129 may all be stored in one centralized memory storage device or in separate memory storage devices, such as shown in FIG. 1. It is understood that the local databases 118 associated with local servers 117 may additionally be accessed by the group advertisement server 120 in a manner similar to the databases 123, 126 and 129, as will be explained in greater detail herein.

An example of a group advertisement operation at a public location such as a shopping mart according to the system 100 of the invention is now provided. When a customer presents goods/services for purchase to a cashier manning a cash register 111, the cashier enters in cash register 111 data about the goods/services and their prices. After the cost of these goods is displayed to the customer, his/her shopping or charge card is read by card reader 112. The information contained on the card includes charge account information as well as the customer identity and the card reader system 112 may be used to verify charge cards and identify persons in the location. The customer's identity, goods/services being purchased and their prices (current transaction data) are communicated to the local server 117 which relays the current transaction data to the group advertisement server 120 via network 99. In response, the advertisement server 120 uses the current transaction data of one or several persons at that location (e.g., shopping mart) to generate and download one or more advertisements that take into account common characteristics of one or more persons at that location and engaged in the common activity (e.g., buying goods). For example, if medicine for treating headache is being purchased by several persons in the store 103 within a predetermined time interval, the group advertisement server 120 may download an advertisement for display at a monitor 102 at that location which comprises a description of a new medicine for headache treatment. The group advertisement server 120 additionally has access, via the user/person database 126, to goods/services that customers in the group may have purchased in the past. For example, if prior transactions involved purchases of books written by a certain author, the group advertisement may include a new book written by the same author. These group advertisements are displayed on public display monitors 102, electronic displays 105, movie screens 106, billboards 101, or announced by loud speakers 108.

Another example of a group advertisement operation at a public location according to the system 100 of the invention is now provided. As shown in FIG. 1, video cameras/systems 114 are arranged at the public locations to obtain images of persons at the location and transmit the images to the advertisement server 120 (via the local servers 117 and network 99). In response, the advertisement server 120 uses the current image data of one or several persons at that location (e.g., shopping center) to produce one or more advertisements that take into account common characteristics of persons at that location and engaged in the common activity. For example, the image data may be used for producing an advertisement related to the customers' physical appearances. For example, if the image data shows several women in some section of a cosmetic section of a store with red hair, the advertisement on a public display monitor 102 may include a description of shampoo for red hair if it is sold in this section. If there are several groups of people with different interests that are known from prior transaction history (e.g., women that have small babies and males that smoke), then the advertisement system may choose the largest group of people to present advertisement for their interests, or the system may display consecutive different advertisements (e.g. one for baby food, and another for cigarettes). Furthermore, a ticket sales machine 113 at a movie theater 107 may be associated with a video camera 114 that captures an image of the physical appearance of a particular customer who is purchasing a ticket. This image data may be packaged with the current transaction data and communicated to the group advertising server 120 for a personalized advertisement that can be displayed at the appropriate time on a movie screen 106.

Another example of a group advertisement operation at a public location according to the system 100 of the invention is now provided in further view of FIG. 1. The local server 117 at a food market 103, for instance, comprises information about all goods/services that are available. The mall may implement kiosks or data terminals 119 communicable with the server 117 to enable customers to search for goods/services that are displayed via the server 117. The current transaction data of the search inquiries by several persons may be packaged with the customer identities and communicated via local server 117 to the group advertisement server 120. The group advertisement server 120, in response, may generate a group advertisement related to the search results corresponding to consumer searches, and download the advertisement for display at the public display monitor 102. For example, if several customers search local server 117 for low-fat food products, for example, the group advertisement may be related to other low fat food products.

In the preferred embodiment, methods for establishing user identities and physical characteristics include: video camera devices for obtaining visual images; "biometrics" systems including devices (not shown) for obtaining customer's fingerprints, eye scans, voice patterns, and the like, which are increasingly implemented for personal identification in order to access systems/services. Voice, detection, for example, enables female customers to be distinguished from male customers and adults from children, for example. In the case that biometrics are used for person identification, a database (not shown) of biometric information that index to person identities may be used or included in the person/customer database 126. Another method for establishing user identities includes implementation of a Global Positioning Satellite System (GPS) 125 for enabling identification and location of vehicles, such as automobile 127, as shown in FIG. 1. Such GPS systems are increasingly implemented in automobile and transportation systems, and can be used in the present invention for identifying drivers of automobiles and other vehicles approaching an electronic bill-board display 101 on roads or highways 110, for example. If there are several cars having drivers whose identities are identified via the GPS system 125 in accordance with the invention and who have common characteristics, the appropriate advertisement may be generated by the group advertising server 120 for download to the electronic bill-board display 101. As an example, if it is detected that there are several drivers in the same location with some common interests, then an advertisement would be displayed on a bill board at this location that addresses these common interests. Examples of common interests could be hobbies (sport, music), tastes (smoking, drinking), professional activities, etc. If, for example, an advertisement system detects that several drivers in cars near the bill board like beer, it would display advertisements for a beer product. If the GPS system detects that cars approaching a billboard on a highway belong to women drivers, the content of the bill board may change to display advertisements related to cosmetic products, for example. It should be understood that the GPS system tracking devices may be installed on personal devices such as watches, cellular telephones, etc., that may be worn or carried by persons. These individual GPS devices may be used to identify persons in stadiums, train stations, etc.

Figure 2:
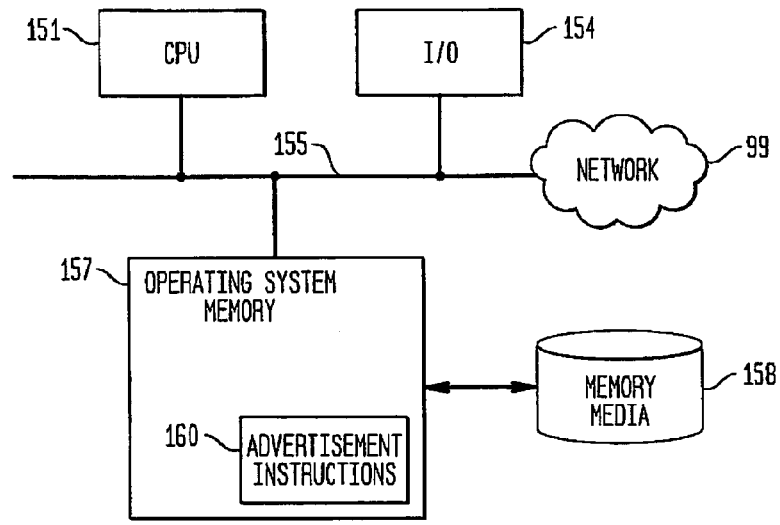
FIG. 2 is a block diagram of a local server provided in the system of FIG. 1.

Referring now to FIG. 2, each local server device 117 may be embodied as comprising a central processing unit (CPU) 151, I/O (I/O) devices 154 (such as cash register 111, card readers 112 and, and video camera 114 devices shown in FIG. 1) and operating memory 157 interconnected via a bus 155. It is understood that I/O devices 154 may communicate with cash register 111, card reader 111 and 112, and video camera 114 devices via network connections or telephone lines. For the case of ticket sale machines 113, the I/O devices may include video camera 124, a keypad and a ticket printer. I/O devices 154 additionally include a transceiver device for sending group optimized advertising requests to and receiving optimized group advertisements from advertising server 120.

Stored in operating system memory 157 are system instructions 160 for providing local assisted advertisement functions that are relevant to group optimized personalized advertisement. The local server 117 also communicates with the advertisement server 120 and displays via I/O devices. Local system instructions 160 may additionally be provided by memory media device 158 which according to the present invention enables the computer system to obtain from advertisement server 120 a group optimized advertisement. Preferably, the memory media 158 and system instructions 160 are executed to perform the following: 1) configuring the server system 117 to receive data concerning the current transaction for the particular user; 2) configuring the server system to extract advertisement request data from information received about customer activities and transaction data; 3) configuring the server system 117 to send the advertisement requests data and information about person activities to the advertisement server and to receive from the advertisement server the optimized group advertisement; and 4) configuring the server system 117 to communicate the optimized advertisement to the group of persons, via above-described advertisement display devices. Local system 160 configures CPU 151 to perform the group advertising process as described herein.

Figure 3:
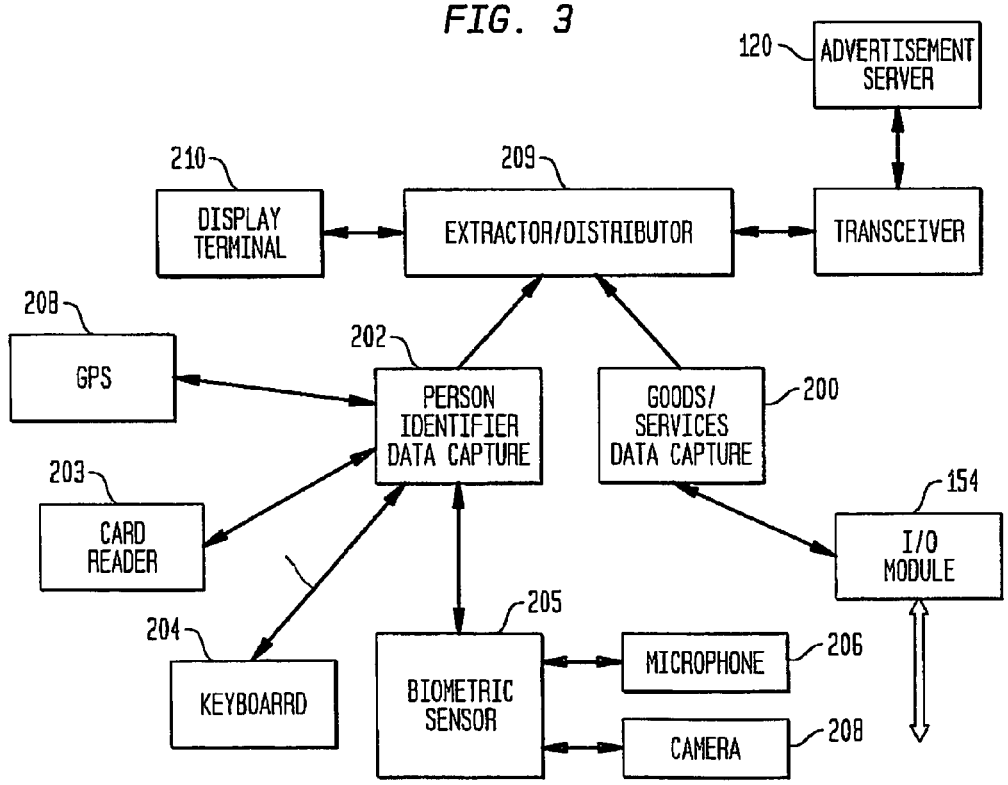
FIG. 3 is a functional block diagram depicting the operation of a local group optimized advertisement procedure implemented in the local server of FIG. 2.

FIG. 3 illustrates a functional block diagram depicting the various functional processes performed by the local server system 117 in accordance with memory media 158 and system instructions 160. As shown in FIG. 3, an I/O module 154 receives current customer purchase transaction data including types and prices of goods/services that are communicated to the server from the various input devices. A data capture process 200 is invoked to capture this current transaction data and likewise, a user-identity data capture process 202 is invoked for processing user identity data from one or more of various input and sensor devices, e.g., card reader 203, keyboard 204, GPS 208 and biometric sensor 205. Preferably, card reader module 203 receives user identity data from a card reader, such as card readers 112 or 113 of FIG. 1; keypad module 204 receives user identity data from a device having a keypad, e.g., entering of user id or password or account, such as cash register 111, gas pump, ticket sales machine 113; and, sensor module 205 receives user identity data from biometric input devices shown in FIG. 3 as microphone device 206 and camera device 207.

Current transaction and user identity data captured by modules 200 and 202 and advertisements generated by server 120 is processed by an extractor/distributor module 209 which divides the current transaction data into various parts for distribution to either a public display device 210 or to advertisement server 120. An example of current transaction data that extractor/distributor module 209 receives from data capture module 200 includes data concerning goods that were selected by customers. For example, using video camera 207, pictures of goods that customers selected are sent to module 200 where titles and prices of these goods are captured and sent to module 209 for further distribution. Examples of information that is transmitted to public terminal display 210 are group advertisements that relate to transactions conducted by several persons in the same location during a predetermined time interval. Examples of information that is sent to advertisement server 120 are customer identity including one or more characteristics relating to each person in the group including: name, physical characteristics, age, gender, biometrics, and the purchased goods and prices chosen by the customer. Communication with servers 120 is done through a transceiver module 211 that includes a communication port and other communication support functions.

According to the present invention, the advertisement server 120 generates an advertisement that is optimized to one or more persons located at a public location and engaged in similar activities (e.g. purchasing transactions, attending a sporting event, etc.). Thus, the system depicted in FIG. 2 including the CPU 151, operating memory 157 and I/O devices 154, performs the following: receiving, via I/O devices 154, data concerning the activities of each person in some location; using activities data, with the aid of CPU 151, to extract advertisement request data for every person who performs a transaction at the same location; operating I/O devices 154 to communicate the advertisement requests data and information on person activities to advertisement server 120 and to receive from advertisement server 120 the optimized group advertisement for communication to the group of people via public terminals or loud speakers.

Figure 4:
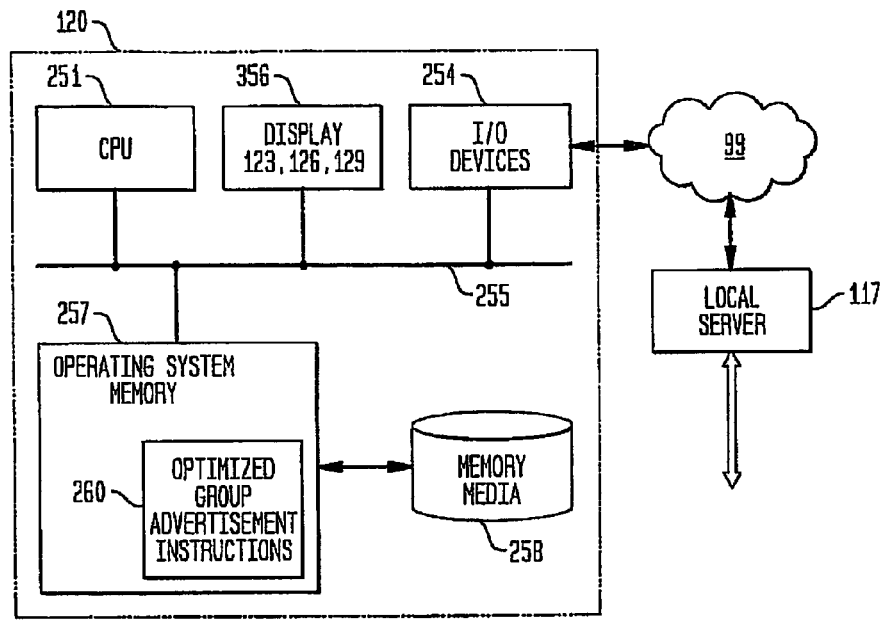
FIG. 4 is a block diagram of an advertisement server provided in the system of FIG. 1.

Referring now to FIG. 4, the advertisement server 120 is shown comprising a central processing unit (CPU) 251, I/O devices 254 that include the appropriate communication devices for sending and receiving data via network 99 to local servers 117, and an operating memory 257 and interconnected via a bus 255. Additionally connected to bus 255 is a database device 356 which comprises databases 123, 126 and 129. Stored in operating memory 257 and additionally in memory media 258 are instructions for configuring the CPU 251 to perform the group advertisement optimization process as described herein.

Figure 5:
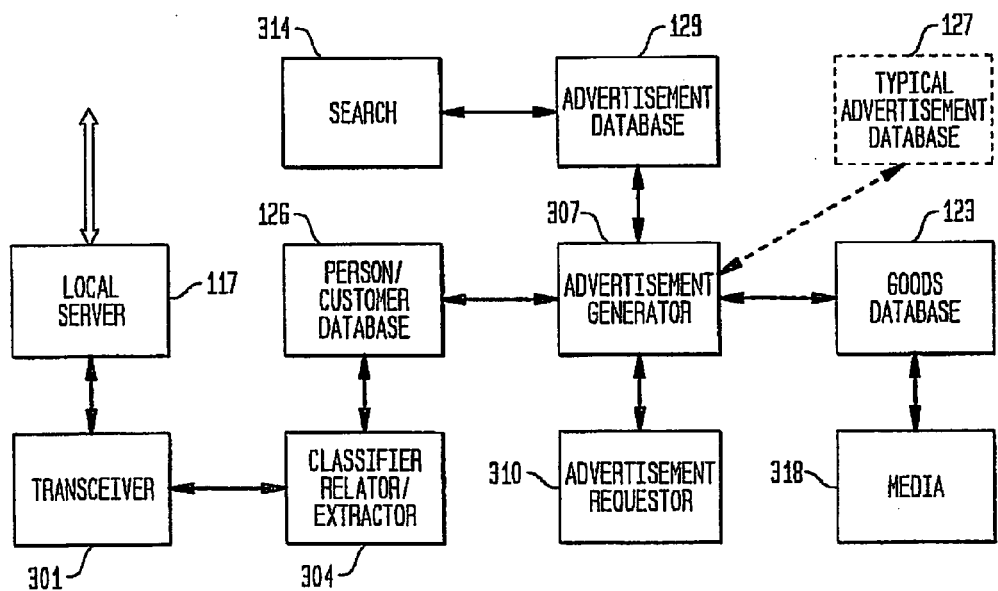
FIG. 5 is a functional block diagram depicting the operation of a group optimized advertisement procedure implemented in the advertisement server of FIG. 4; and, FIG. 6 is a process flow chart illustrating the group advertisement optimization process.

Referring now to FIG. 5, there is illustrated a functional block diagram depicting the various functional and processing units performed by the group advertisement server 120 in accordance with memory media 258 and system instructions 260. As shown in FIG. 5, the optimized group advertisement procedure 260 includes a transceiver process 301 for receiving from local server 117 group activity and transaction data and for sending back to local server 117 a group optimized advertisement. In response, transceiver module 301 transmits the current transaction data to a classifier/relater module 304 which functions to classify the current person activity data according to one or more criteria including, but not limited to, the following: age (old, young), gender (male, female), behavioral characteristics (smoking, drinking), physical characteristics (hair color type, height, weight, etc.), citizenship. A person's classification behavioral characteristics may be obtained from the analysis of visual data according to methods described in commonly-owned, co-pending U.S. patent application Ser. No. 09/079,754 (Y0998-033-), entitled "APPARATUS AND METHOD FOR USER RECOGNITION EMPLOYING BEHAVIORAL PASSWORDS" and commonly-owned, co-pending U.S. patent application Ser. No. 09/238,845 (YO9-98-508-) entitled "A VIRTUAL MAP SYSTEM AND METHOD FOR TRACKING OBJECTS", the whole contents and disclosure of each being incorporated by reference as if fully set forth herein. For instance, a person's behavioral characteristics may include the following: smoking, drinking beer, driving cars, watching movies, etc. according to objects that that person manipulates (e.g., cigarettes, beer bottles, etc.). Another way to extract characteristics is to detect and analyze a person's transactions in stores (e.g., when they are processing orders via cash registers), in movies (e.g., when persons buy tickets), and at special locations (e.g., roads, stadiums etc.). Goods/services purchased by persons may be further classified according to type, e.g., medicine, clothing, appliances, tools, prices and the like. Further, the group optimized advertisement system may be programmed in such a way that it chooses the advertisement optimized not only for the maximum number of persons, but optimized for persons having the largest money income. For example, in a department store, the system may detect that several persons have purchased very expensive items, or belong to a category of users with very high income. In this scenario, the system will generate the advertisement (on some public display in the shop) that is oriented for this category of wealthier people.

The classifier/relater module 304 includes an extractor component which functions to extract common elements from characteristics of several persons, e.g., several persons at a location who are determined as being old and female, or several persons who are smoking. Additionally, the classifier/relater module 304 functions to relate different pieces of collected data. For example, classifier/relater module 304 relates classes of customers and their behavioral characteristics to classes of goods. For example, smoking persons can be related to cigarettes, drivers to cars, etc. Preferably, the relationship between classes of different goods/services may be represented as a table (not shown) with entries in intersections of columns and rows that count how often corresponding pairs of classes occur. As shown in FIG. 5, the classification information produced by module 304 is stored in customer/person database 126 which includes customer names, customer classes, history of customer activity (for example, what the customer has bought and when, what places he visited, what movies he saw, in what kind of activities he/she engages) and any other data essential for advertisement optimization. If the optimizer finds that the same items are strongly linked to several persons located to the same place the optimizer would rank this item accordingly. This information is used by the advertisement generator module 307 which functions to decide what item to advertise based not only on available ranks of items in the database 126 but on available advertisements in advertisement database 129. For example, if there are two items (e.g., beer and cigarettes) and a cigarette is ranked higher than beer (i.e., there are more people at that location that smoke than drink), the advertisement generator module 307 may produce an advertisement about cigarettes. However, if only beer advertisements are provided in the database 129, then the advertisement generator module 307 will produce an advertisement about beer. Furthermore, the advertisement generator module 307 may not have advertisements for particular goods because of certain constraints. For example, an agency may not want to advertise cigarettes because of health concerns, or it may only provide advertisements for goods that were previously ranked higher in the past. In this case, the advertisement generator module 307 may immediately use an existing advertisement for one type of goods to be sent to public displays and start to produce advertisements for goods that are missing in their database. Additionally, the advertisement module 307 may start to produce advertisements for new goods that may be anticipated as having higher ranks at some time in the future.

As shown in FIG. 5, in operation, an advertisement requester module 310 functions to place advertisements for a corporate entity into the advertisement database 129. Specifically, the advertisement requester 310 specifies a form for the requested advertisement depending upon factors such as: the public location, the time duration and, the manner in which the advertisement will be shown to the persons, (e.g., a public display monitor or playback via loud speakers). If there are several advertisements to different groups of people in the same location, the advertisement requester 310 may control a scheduling of advertisements to be displayed. For example, it may first display beer advertisement and then shampoo for persons with red hair if the information shows that there are several persons ordering beer in a restaurant with several women present having red hair.

A request for a special personalized kind of advertisement may also be included in a message that is sent from local server 117. For instance, local server 117 may limit the advertisement to certain product/brand types. In response to the request via classifier/relater module 304, advertisement requester module 310 will send an advertisement request for the current transactions or person activities to the advertisement generator module 307.

Advertisement generator module 307 will query user database 126, goods/services database 123 and advertisement database 129 to produce an advertisement that is personalized to the particular user and fits a format requested by advertisement requester module 310. A search module 314 searches for existing advertisements in advertisement database 129 using the current transaction or person activity data. If a suitable advertisement is found, it is sent to local server 117 via transceiver module 301. It is understood that the type and/or format of the group advertisement selected will be based on common interests of the identified persons in the group.

As mentioned, the most suitable advertisement for most of the identified members in the group may be generated by selecting a common advertisement from the advertisements contained in the database 129. However, according to the invention, the advertisement generator 307 may produce advertisements for goods that are missing in their database, i.e., it may create a new advertisement for storage in advertisement database 129 and/or communicate a newly created advertisement to a particular user. The advertisement generator module 307 thus functions similar to the apparatus as described in above-mentioned commonly-owned, co-pending U.S. patent application Ser. No. 09/183,402 (YO998-374). The new advertisement may be based on goods or services contained in goods/services database 123. Goods/services database 123 is updated with information about new goods/services obtained from a media module 318 that comprises all forms of media for selecting information about goods/services (e.g., Internet, TV, newspapers, and the like).

Advertisement generator 307 may also further send current transaction data to creators of advertisements for manually or automatically generating new advertisements. The advertisement generator also has access to a database 127 comprising a person's behavioral biometric information characteristics. Such biometric database 127 is described in commonly-owned, co-pending U.S. patent application Ser. No. 09/079,754, filed on May 15, 1998, entitled APPARATUS AND METHOD FOR USER RECOGNITION EMPLOYING BEHAVIORAL PASSWORDS, the whole contents and disclosure of which is incorporated by reference as if fully set forth herein. This database may be updated using information that is obtained when persons activities are recorded at a public some location. The new information about a persons' behavioral characteristics may be classified and categorized according to techniques described in U.S. patent application Ser. No. 09/079,754.

Thus, in accordance with a preferred embodiment of the present invention, a process for optimizing an advertisement for transmission to a group of persons according to their current transactions or activities, includes: 1) storing in database 356 data concerning a plurality of (a) persons and their activities, (b) goods or services, and (c) advertisements for various ones or categories of said goods or services or activities; 2) receiving, via I/O devices 254, data concerning a current transaction for the group of persons; 3) processing the current transaction or person activity data with processor 251 including classifying the current transaction or person activity data according to categories of goods/services/behavioral characteristics; 4) altering a person's data in the database with the current transaction or activity data performed by that person; 5) identifying and ranking common elements in different person data from the same location in the same period of time; 6) generating the advertisement optimized to the particular user; 7) and operating the I/O devices 254 to communicate the optimized advertisement to the group of persons.

The above-enumerated steps are depicted in the flow chart of FIG. 6. As shown in FIG. 6, the first step 330 includes classifying the current transaction or person activity data 339 according to categories of goods/services/behavioral characteristics in order to produce classification/ranking data and by relation to prior transactions/activities of the persons to produce relation data. The current transaction/activity data includes for the particular user, an identity (optionally, biometrics), the goods/services/activities and related prices of products purchased or activities performed by each person at the given public location. As shown at step 333, the classification is done according to criteria selected from the group that includes age, gender, area of residence, citizenship and physical characteristics of the particular user and type and price of goods/services involved in the current transaction. The data classes and activities data is stored, as indicated at step 336, and, the common elements for each the identified users is extracted, as indicated at step 340. Then, at step 343, a relating step is performed whereby the classes of customers are related to the categories of goods/services/activities. As shown at step 346, this step may require the query into a database comprising a table of products and services. Next, at step 351, the classification and relation data is then used to alter the person's data in the person/customer database 126 (FIG. 1). Then, at step 355, an optimized advertisement is generated based on the prior transactions/person activities or the current transaction/person activities by either selecting an advertisement from the advertisements contained in the advertisements database or by creating a new advertisement with use of the goods/services/activities data. Preferably, the optimization includes the aforementioned ranking mechanism with the ranking being performed in accordance with number of persons having the same feature (linked people) or, cost of goods/services that could be related to these features. Finally, at step 360, the data is sent to the advertisement generator (FIG. 5).

In accordance with the present invention, as shown in FIG. 5, the memory media module 258 has stored therein optimized advertisement procedure 260 for configuring the computer system shown in FIG. 4 to receive, via I/O devices 254, data concerning the current transaction for the particular user. The optimized group advertiser also configures the computer 120 to process the current transaction data with processor 251, to alter the user data in the database with the current transaction data, to generate the advertisement optimized to the particular user and to operate the I/O devices to communicate the group optimized advertisement to the particular user.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for dynamically generating in real-time an advertisement optimized for a group of people located at a public location, said system comprising:
    means for obtaining real-time visual images of members of said group while engaged in a common activity at a public location;
    means for obtaining biometric data of one or more members of said group;
    means for obtaining transaction data based on current or past transactions performed by one or more group members;
    processing means for contemporaneously receiving said obtained visual images, biometric data and transaction data, determining identities of members of said group from said biometric data and transaction data, and common physical attributes of group members or common real-time behavioral activities performed by group members, or both, based on said received visual images, and extracting common personal characteristics based on the determined identities and, one or more determined physical attributes or real-time behavioral activities performed that are common among said group members;
    means for associating in real time products/services with said common personal characteristics of said group members;
    means for ranking suitable products/services for advertisement according to said common personal characteristics;
    means for generating an optimized advertisement related to products or services according to said ranking; and,
    means communicable with said processing means for transmitting said optimized advertisement to a communication device located at said public location for communicating said optimized advertisement to said group while at said public location.

2. The system as claimed in claim 1, further including database memory including data relating to said group of people including identity data, data relating to a plurality of products and services, and advertisement data relating to various ones or categories of said products or services, said processing means collecting data by querying said database memory for identifying two or more persons at said location.

3. The system as claimed in claim 2, wherein said obtained current transaction data includes product purchasing transaction performed by two or more persons at said location.

4. The system as claimed in claim 3, wherein said past transaction data includes a history of prior products and service purchase transactions completed by said two or more persons identified in said group.

5. The system according to claim 4, wherein said processing means further comprises means for classifying obtained data according to predetermined criteria and generating classification data, said classifying means classifying data according to two or more criteria selected from the group consisting of: a person's age, gender, area of residence, citizenship, physical characteristics, type of products involved in a current transaction, and prices of products involved in a current transaction.

6. The system according to claim 5, further including means for relating current obtained data of an identified person to categories of products and services obtained from prior purchase transactions for said identified person and generating relation data, said system including means for updating data relating to said persons in said database memory with said classification data and said relation data.

7. The system according to claim 5, wherein said means for generating an advertisement includes means for selecting an optimized advertisement according to said ranking from said advertisements contained in said database memory.

8. The system according to claim 7, wherein said selecting means further including means for further initiating creation of a new advertisement through use of said products/services data when an optimized advertisement selection is not available.

9. The system according to claim 1, wherein said means communicable with said processing means includes input/output devices and a network interface for communicating said optimized advertisement over a network to said communication device.

10. The system according to claim 9, wherein said network includes the Internet.

11. The system according to claim 1, wherein said communication device includes one of: a television monitor, a digital display device, a loud speaker device, an electronic billboard device, a printed sales receipt.

12. A method for dynamically generating in real-time an advertisement optimized for a group of persons located at a public location, said method comprising the steps of:
   a) obtaining real-time visual images of members of said group while engaged in a common activity at a public location;
   b) obtaining biometric data of one or more members of said group;
   c) obtaining transaction data based on current or past transactions performed by one or more group members;
   d) using a computer to process said obtained visual images, biometric data and transaction data to determine identities of members of said group and, common physical attributes of group members or common real-time behavioral activities performed by group members, or both;
   e) using a computer to extract common personal characteristics of said group members based on the determined identities and one or more determined physical attributes and real-time behavioral activities performed that are common among said group members;
   f) using a computer to associate in real time products/services with said common personal characteristics of said group members;
   g) using a computer to rank suitable products/services for advertisement according to said common personal characteristics;
   h) using a computer to generate an optimized advertisement related to products or services according to said ranking; and,
   i) transmitting said optimized advertisement to a communication device located at said public location for communicating said optimized advertisement to said group while at said public location.

13. The method as claimed in claim 12, further including the step of: storing data in a database memory, said data relating to said group of people including identity data, data relating to a plurality of products and services, and advertisement data relating to various ones or categories of said products or services, said processing step including the step of querying said database memory for identifying two or more persons at said location.

14. The method as claimed in claim 13, wherein said current transaction data is obtained from product purchasing transactions performed by two or more persons at said location.

15. The method as claimed in claim 14, wherein said past transaction data includes a history of prior products and service purchase transactions completed by two or more persons identified in said group.

16. The method according to claim 15, wherein said processing step further includes the steps of classifying obtained data according to predetermined criteria and generating classification data, said predetermined criteria selected from the group consisting of: a person's age, gender, area of residence, citizenship, physical characteristics, type of products involved in a current transaction, and prices of products involved in a current transaction.

17. The method according to claim 16, further including the steps of:
   relating current obtained data of an identified person to categories of products and services obtained from prior purchase transactions for said identified person and generating relation data; and,
   updating data relating to said persons in said database memory with said classification data and said relation data.

18. The method according to claim 16, wherein said generating step h) further includes the step of selecting an optimized advertisement according to said ranking from advertisements contained in said database memory.

19. The method according to claim 18, wherein said selecting step further includes the step of initiating creation of a new advertisement through use of said products/services data when an optimized advertisement selection is not available.

20. The method according to claim 12, wherein said optimized advertisement is transmitted to a communication device via a network.

21. A program storage device readable by a machine, tangibly embodying a program of instructions executable by the machine to perform method steps for dynamically generating in realt-time an advertisement optimized for a group of-persons located at a public location, the method steps comprising:
   a) obtaining real-time visual images of members of said group while engaged in a common activity at a public location;
   b) obtaining biometric data of one or more members of said group;
   c) obtaining transaction data based on current or past transactions performed by one or more group members;
   d) using a computer to process said obtained visual images, biometric data and transaction data to determine identities of members of said group and, common physical attributes of group members or common real-time behavioral activities performed by group members, or both;
   e) using a computer to extract common personal characteristics of said group members based on the determined identities and one or more determined physical attributes and real-time behavioral activities performed that are common among said group members;
   f) using a computer to associate in real time products/services with said common personal characteristics of said group members;
   g) using a computer to rank suitable products/services for advertisement according to said common personal characteristics;
   h) using a computer to generate an optimized advertisement related to products or services according to said ranking; and,
   i) transmitting said optimized advertisement to a communication device located at said public location for communicating said optimized advertisement to said group while at said public location.

22. The program storage device as claimed in claim 21, wherein the method steps further includes the step of: storing data in a database memory, said data relating to said group of people including identity data, data relating to a plurality of products and services, and advertisement data relating to various ones or categories of said products or services, said collecting data step b) including the step of querying said database memory for identifying two or more persons at said location.

23. The program storage device as claimed in claim 22, wherein said current transaction data is obtained from product purchasing transactions performed by two or more persons at said location.

24. The program storage device as claimed in claim 23, wherein said past transaction data includes a history of prior products and service purchase transactions completed by said two or more persons identified in said group.

25. The program storage device according to claim 24, wherein said processing step further includes the steps of classifying obtained data according to predetermined criteria and generating classification data, said predetermined criteria selected from the group consisting of: a person's age, gender, area of residence, citizenship, physical characteristics, type of products involved in a current transaction, and prices of products involved in a current transaction.

26. The program storage device according to claim 25, wherein said method steps further includes the steps of:
relating current obtained data of an identified person to categories of products and services obtained from prior purchase transactions for said identified person and generating relation data; and,
updating data relating to said persons in said database memory with said classification data and said relation data.

27. The program storage device according to claim 25, wherein said generating step h) further includes the step of selecting an optimized advertisement according to said ranking from said advertisements contained in said database memory.

28. The program storage device according to claim 27, wherein said selecting step further includes the step of initiating creation of a new advertisement through use of said products/services data when an optimized advertisement selection is not available.

29. The program storage device according to claim 21, wherein said optimized advertisement is transmitted to a communication device via a network.

* * * * *